US012024453B2

(12) United States Patent
Floren et al.

(10) Patent No.: US 12,024,453 B2
(45) Date of Patent: Jul. 2, 2024

(54) APPARATUS AND METHOD FOR TREATING AN AQUEOUS LIQUID (71) Applicant: BRITA SE, Taunusstein (DE)

(72) Inventors: Simon Floren, Waldbrunn (DE); Peter Weidner, Roetz (DE); André Koehler, Deesen (DE); Berthold Conradt, Wiesbaden (DE)

(73) Assignee: BRITA SE, Taunusstein (DE)

( * ) Notice: Subject to any disclaimer, the term of this patent is extended or adjusted under 35 U.S.C. 154(b) by 404 days.

(21) Appl. No.: 15/755,731

(22) PCT Filed: Sep. 9, 2016

(86) PCT No.: PCT/EP2016/071252
§ 371 (c)(1),
(2) Date: Feb. 27, 2018

(87) PCT Pub. No.: WO2017/042307
PCT Pub. Date: Mar. 16, 2017

(65) Prior Publication Data
US 2019/0119137 A1    Apr. 25, 2019

(30) Foreign Application Priority Data
Sep. 10, 2015 (EP) .................................... 15184680

(51) Int. Cl.
*C02F 9/00*      (2023.01)
*C02F 1/42*      (2023.01)
(Continued)

(52) U.S. Cl.
CPC .................. *C02F 9/00* (2013.01); *C02F 1/42* (2013.01); *C02F 2001/425* (2013.01);
(Continued)

(58) Field of Classification Search
None
See application file for complete search history.

(56) References Cited

U.S. PATENT DOCUMENTS 3,776,842 A * 12/1973 Grimme ............... B01D 61/022
                                                  210/638
5,174,901 A    12/1992 Smith
(Continued)

FOREIGN PATENT DOCUMENTS

EP    2898782 A1    7/2015
RU    2186736 C1    8/2002
(Continued)

OTHER PUBLICATIONS

Anthony Withers, Options for recarbonation, remineralisation and disinfection for desalination plants, Desalination, vol. 179, Issues 1-3, 2005, pp. 11-24 (Year: 2005).*
(Continued)

*Primary Examiner* — Jason M Greene
*Assistant Examiner* — Eric J McCullough
(74) *Attorney, Agent, or Firm* — Hudak, Shunk & Farine Co. LPA (57) ABSTRACT An apparatus for conditioning an aqueous liquid includes at least one inlet, at least one liquid treatment device for the treatment of liquid by ion exchange including a cation exchange material of which at least a portion is in the hydrogen form, a membrane filtration device and a section arranged to process filtrate produced by the membrane filtration device. This section includes a liquid treatment device for dissolving at least one mineral contributing to carbonate hardness in water into at least some of the liquid passing through the section. At least one of the at least one inlets is connected to an inlet of the membrane filtration
(Continued)

device via at least one of the at least one liquid treatment devices for the treatment of liquid by ion exchange.

20 Claims, 3 Drawing Sheets

(51) Int. Cl.
*C02F 1/44* (2023.01)
*C02F 1/66* (2023.01)
*C02F 1/68* (2023.01)

(52) U.S. Cl.
CPC ............... *C02F 1/44* (2013.01); *C02F 1/441* (2013.01); *C02F 1/442* (2013.01); *C02F 1/66* (2013.01); *C02F 1/688* (2013.01); *C02F 2201/006* (2013.01); *C02F 2209/005* (2013.01); *C02F 2209/03* (2013.01); *C02F 2209/05* (2013.01); *C02F 2209/055* (2013.01); *C02F 2209/40* (2013.01); *C02F 2301/043* (2013.01); *C02F 2307/10* (2013.01)

(56) References Cited

U.S. PATENT DOCUMENTS

| | | | | |
|---|---|---|---|---|
| 5,997,745 | A * | 12/1999 | Tonelli | B01D 61/022 210/180 |
| 6,113,797 | A * | 9/2000 | Al-Samadi | C02F 1/441 210/705 |
| 6,416,668 | B1 * | 7/2002 | Al-Samadi | B01D 61/025 210/639 |
| 2014/0014582 | A1 * | 1/2014 | Muro | B01D 61/146 210/638 |
| 2014/0262095 | A1 * | 9/2014 | Kemp | D21C 11/0021 162/190 |

FOREIGN PATENT DOCUMENTS

| | | |
|---|---|---|
| RU | 2457184 C2 | 7/2012 |
| WO | 2014006128 A1 | 1/2014 |
| WO | WO-2014006128 A1 * | 1/2014 ......... G01N 33/1853 |
| WO | 2014093049 A1 | 6/2014 |
| WO | WO-2014093049 A1 * | 6/2014 ............... C02F 1/68 |

OTHER PUBLICATIONS

Frank N. Kemmer, The NALCO Water Handbook, Nalco Chemical Company, 1988, Chapter 12, pp. 12.1-12.8, McGraw-Hill Book Company, U.S.

C.E. Harland, Ion Exchange Theory and Practice, 1994, pp. 104-113, Second Edition, The Royal Society of Chemistry, Cambridge, U.K.

Andrei A. Zagorodni, Ion Exchange Materials Properties and Applications, 2007, pp. 193-197, Elsevier, Amsterdam, the Netherlands.

* cited by examiner

APPARATUS AND METHOD FOR TREATING AN AQUEOUS LIQUID

FIELD OF THE INVENTION

The invention relates to an apparatus for conditioning an aqueous liquid, including: at least one inlet; at least one liquid treatment device for the treatment of liquid by ion exchange including a cation exchange material of which at least a portion is in the hydrogen form; a membrane filtration device; and a section arranged to process filtrate produced by the membrane filtration device, which section includes a liquid treatment device for dissolving at least one mineral contributing to carbonate hardness in water into at least some of the liquid passing through the section.

The invention also relates to a method of conditioning an aqueous liquid, including: at least one step of subjecting the liquid to a treatment by ion exchange, wherein the liquid is contacted with a cation exchange material of which at least a portion is in the hydrogen form to create free $CO_2$; subjecting the liquid to membrane filtration to obtain filtrate; and treating the filtrate, wherein treating the filtrate includes increasing the concentration of at least one mineral contributing to carbonate hardness in water.

BACKGROUND OF THE INVENTION

U.S. Pat. No. 5,174,901 discloses a liquid purifying system. Water is first passed through a sand filter, where particulate matter is removed. The water then passes through a carbon filter, where excess chlorine and/or tri-halo methanes are removed. It next passes through a water softener for removal of divalent metals, such as calcium, magnesium, iron and manganese. Following this pre-treatment, water passes into a storage tank, from where it is pumped into a reverse osmosis unit. The reverse osmosis unit is designed to recover variable percentages of the water pumped through the unit. From the reverse osmosis unit, the water passes through a strong acid cation exchange resin, which converts the total dissolved solids in the water from a salt to an acid in an amount proportional to the anions present in the effluent. The acidified water then passes through a bed of pure calcium carbonate, which neutralises the water.

WO 2014/093049 A1 discloses a water production system that is configured for installation under a counter. The system includes an adapter that is configured for attachment to a cold side domestic water supply. A filter that is fluidly coupled to the adapter filters the water so that no particles in excess of 5 microns pass through. A further filter that contains a metallic-based and biostatic material such as KDF or one of its substitutes that removes chlorine via a redox reaction that changes the chlorine to chloride and also a special enhanced activated carbon is attached to the filter. Fluidly connected to the water [sic] from the further filter through a valve is a cylindrical housing or housings containing a reverse osmosis membrane or membranes. The water from the valve flows axially through the membrane and divides into two paths internally. One path is to drain. The other flow from the membrane/housing assembly is referred to as product water. This water exits the housing through a check valve. The product flow after the check valve is fluidly connected to the shut-off valve and from there it is fluidly connected to a cation resin cartridge filter. Water entering the filter is first exposed to a cation resin where all remaining dissolved solids with a positive valence are exchanged for hydrogen ions. The resulting acid water then passes through a volume of special anion resin. This resin will remove anions, thus neutralising the acids, except for the mild carbon dioxide portion of the carbonic acid which is desired to produce a desired resulting chemistry of the finished water for the user. Water exiting the cation resin cartridge filter is fluidly connected to a duplicate polishing version of the cation resin cartridge filter. Yet a further filter if fluidly connected to the duplicate polishing version of the cation resin cartridge filter and contains a salt of magnesium. Because the water from the polishing filter is like water from the cation resin cartridge filter in that it contains mild carbonic acid, the scale is slowly dissolved, thus imparting magnesium bicarbonate to the water. A valve fluidly connects the inlet to the outlet of the filter containing the salt of magnesium, permitting an end user to variably control the degree of magnesium bicarbonate in the water. When the valve is fully closed, all water will pass through the filter, thus maximising the concentration. When the valve is fully open, virtually all water will bypass the filter due to the pressure drop caused by the need for water to pass through the media, thus minimising the presence of magnesium bicarbonate.

SUMMARY OF THE INVENTION

A problem of the known system is that it is not very effective in raising the magnesium bicarbonate concentration, in particular for certain types of mains water. Thus, the water may have a lower mineral content than is recommended for certain applications.

It is an object of the invention to provide an apparatus and method of the types recited above in the opening paragraphs that allow the mineral contents of liquid treated by membrane filtration to be raised to a desired extent.

This object is achieved according to a first aspect by the apparatus according to the invention, which is characterised in that at least one of the at least one inlets is connected to an inlet of the membrane filtration device via at least one of the at least one liquid treatment devices for the treatment of liquid by ion exchange, in that the apparatus forms an essentially closed system so that degassing of carbon dioxide is prevented, and in that the at least one membrane in the membrane filtration device is permeable to carbon dioxide.

The liquid treatment device for the treatment of liquid by ion exchange is effective to release hydrogen in exchange for the cations of carbonate minerals in the liquid to be treated, thus increasing the amount of free carbon dioxide in the liquid. The apparatus forms an essentially closed system, so that the carbon dioxide is not degassed, but remains in the liquid. The membrane filtration device will filter salts from the liquid. The membrane or membranes in the membrane filtration device is or are, however, permeable to carbon dioxide. The liquid treatment device would be less effective if situated downstream of the membrane filtration device or in a recirculation conduit of the membrane filtration device, because the membrane filtration device would already have removed most of the ions against which the hydrogen could be exchanged. Thus, the upstream position allows for a higher free carbon dioxide concentration. This in turn allows for a higher concentration of the mineral or minerals contributing to carbonate hardness in the liquid treated in the liquid treatment device for dissolving at least one mineral contributing to carbonate hardness in water. As a side-effect, scaling of the membranes in the membrane filtration device is countered more effectively. Adding free $CO_2$ using a liquid treatment device for the treatment of liquid by ion exchange including a cation exchange material of which at least a portion is in the hydrogen form is more efficient than adding $CO_2$ as a gas, e.g. from a bottle. This is because the free $CO_2$ concentration has to be set at values in the range of $mg \cdot l^{-1}$, i.e. relatively low concentrations, relatively accurately. Bottled gas can only be used to set concentrations in the range of $g \cdot l^{-1}$. Practically, therefore, adding $CO_2$ from a bottle would mean having to degas the liquid to a controlled extent, which would lead to a more complicated apparatus.

The apparatus according to the invention is of use in conditioning potable water, e.g. mains drinking water. It may be used to treat mains drinking water to make it less corrosive in areas where the mains drinking water is processed dune water, because such drinking water has a high level of salt (mainly sodium chloride). If the membrane filtration device is effective in removing the salt, leading to drinking water with low mineral contents, a relatively large amount of minerals needs to be dissolved in order to provide drinking water with acceptable properties. It is then important that as much of the carbonate ions originally present in the water are converted to free $CO_2$, rather than being filtered out by the membrane filtration device.

In an embodiment, the at least one liquid treatment device via which the inlets are connected includes weakly acidic cation exchange resin of which at least a portion is in the hydrogen form.

The weakly acidic cation exchange resin does not lower the pH as much as strongly acidic cation exchange resin. This helps prolong the lifetime of the membrane or membranes. Moreover, the weakly acidic cation exchange resin does not exchange hydrogen for cations of all salts but generally only for cations of carbonate and bicarbonate salts. Thus, more free $CO_2$ is generated for a given treatment capacity of the resin. More free $CO_2$ means that a higher concentration of minerals contributing to carbonate hardness in water can be achieved in the liquid produced by the apparatus. More free $CO_2$ in the liquid to be treated by the membrane filtration device also means that scaling of the membrane or membranes of the membrane filtration device is countered more effectively. Furthermore, the volumetric ion exchange capacity is generally higher than that of strongly acidic cation exchange resins. Also, if the resin has carboxyl functional groups, then the selectivity towards calcium and magnesium is relatively high.

In an embodiment, the at least one liquid treatment device for the treatment of liquid by ion exchange includes at least one replaceable liquid treatment cartridge housing the cation exchange material.

This embodiment makes it possible to use cation exchange material that is not easily regenerated or conditioned at a point of use. This will generally be the case, because at least a portion of the cation exchange material is in the hydrogen form. This material will usually be regenerated using hydrochloric acid. The replaceable liquid treatment cartridge may be connected in liquid communication with a head part having an inlet in liquid communication with the apparatus inlet and an outlet in liquid communication with an inlet of the membrane filtration device. Connection to conduits establishing the liquid communication may be generally permanent, e.g. requiring tools to be disestablished. By contrast, a mechanical interface facilitates locking and release of the liquid treatment cartridge to the head part, e.g. without the use of tools.

In an embodiment, at least one of the at least one inlets of the apparatus is connected to an inlet of the membrane filtration device via a flow path bypassing at least a section of the liquid treatment device containing the cation exchange material of which at least a portion is in the hydrogen form.

This embodiment can help prevent too much of the mineral from being dissolved. A lower amount of free $CO_2$ per unit volume of liquid flowing through the membrane filtration device is formed. The liquid passing through the section containing the cation exchange material of which at least a portion is in the hydrogen form is blended at a mixing location with liquid that has bypassed that section. This mixing location may be upstream of the membrane filtration device so that only one connection to the membrane filtration device is required. In a variant in which the section containing the cation exchange material of which at least a portion is in the hydrogen form is contained in a replaceable liquid treatment cartridge for connection to a head part, the mixing location may be located within the liquid treatment cartridge. The liquid that bypasses the section containing the cation exchange material may be treated by other means than by ion exchange. It may be treated by sorption to remove e.g. heavy metals, organic contaminants or microbial contamination, for example. It may also be treated in a section containing cation exchange material of which a smaller portion or essentially none is in the hydrogen form. If a smaller portion is in the hydrogen form, the exchange of cations for hydrogen is less complete than in the main section, so that less free $CO_2$ is generated and the blending process still results in a lower overall level of free $CO_2$ in the liquid that passes through the membrane filtration device.

A variant of this embodiment includes at least one device, e.g. a variable-ratio flow divider, for adjusting a volumetric flow rate ratio between liquid flowing through the section of the liquid treatment device containing the cation exchange material of which at least a portion is in the hydrogen form and liquid flowing along the flow path bypassing the section.

This variant allows the regulation or control of the carbonate hardness of a conditioned aqueous liquid produced by the liquid treatment apparatus. Thus, this parameter can be varied according to requirements or kept constant in the face of variations in the composition of the liquid supplied to the inlet of the apparatus. It is noted that the device for adjusting a volumetric flow rate ratio may be operable by hand, e.g. with the aid of a table relating settings of the device to a target value of a measure of the concentration of components contributing to carbonate hardness.

A particular variant of this embodiment includes a control device for providing a signal to the device for adjusting the volumetric flow rate ratio in dependence on at least one of a target value and a target range of a measure of a concentration of components in liquid including at least components contributing to carbonate hardness.

In this variant, a consumer of a conditioned aqueous liquid supplied by the liquid treatment apparatus can specify the carbonate hardness, e.g. as a target value or a target range or in terms of information that allows the control device to derive a target value or target range. This is then converted in to a required level of free $CO_2$, which the control device causes to be generated. The measure may correspond to the carbonate hardness, e.g. expressed as °dH or the equivalent concentration of $CaCO_3$, for example. It may be the specific electric conductance, e.g. adjusted for deviations from a reference temperature. The measure may be the specific electrical conductance as measured by an ion-selective sensor.

In a variant of the embodiment in which at least one of the at least one inlets of the apparatus is connected to an inlet of the membrane filtration device via a flow path bypassing at least a section of the liquid treatment device containing the cation exchange material of which at least a portion is in the hydrogen form, the flow path bypassing the section passes through a further liquid treatment section, e.g. a liquid treatment section for the treatment of liquid by sorption.

This variant helps protect the membrane or membranes of the filtration device. Components having an adverse effect on the lifespan of the membrane or membranes can be removed.

In a variant hereof, in which the at least one liquid treatment device for the treatment of liquid by ion exchange includes at least one replaceable liquid treatment cartridge housing the cation exchange material, the further liquid treatment section is contained in the replaceable liquid treatment cartridge.

The further treatment section may thus have a finite treatment capacity that is exhausted during use. When exhausted, the further treatment section is replaced. The capacity of the section containing the cation exchange material of which at least a portion is in the hydrogen form and that of the further treatment section may be at least approximately matched. By combining both treatment sections in one cartridge, only one head part and set of connecting conduits need be provided.

In an embodiment of the apparatus in which the at least one liquid treatment device for the treatment of liquid by ion exchange includes at least one replaceable liquid treatment cartridge housing the cation exchange material and at least one of the at least one inlets of the apparatus is connected to an inlet of the membrane filtration device via a flow path bypassing at least a section of the liquid treatment device containing the cation exchange material of which at least a portion is in the hydrogen form, the liquid treatment cartridge includes a mixing location where the flow path bypassing the section containing the cation exchange material of which at least a portion is in the hydrogen form joins a flow path extending through the section containing the cation exchange material of which at least a portion is in the hydrogen form.

This avoids the need for extra couplers. The head part can be relatively simple and be configured for connection to a single replaceable liquid treatment cartridge.

An embodiment of the apparatus in which at least one of the at least one inlets of the apparatus is connected to an inlet of the membrane filtration device via a flow path bypassing at least a section of the liquid treatment device containing the cation exchange material of which at least a portion is in the hydrogen form includes a flow divider, e.g. located in a head part for receiving at least a section of a replaceable liquid treatment cartridge, for dividing a flow of liquid from at least one of the at least one inlets into a sub-flow passing through the section containing the cation exchange material of which at least a portion is in the hydrogen form and a sub-flow passing along the flow path bypassing the section containing the cation exchange material of which at least a portion is in the hydrogen form.

The flow divider may be a variable-ratio flow divider to split an incoming flow of liquid into two sub-flows at a ratio determined by variable settings of the flow divider, with each sub-flow being supplied through a separate inlet of the replaceable liquid treatment cartridge when connected to the head part. A mix of liquids is returned to the head part, from where it is conducted to the membrane filtration device. The flow divider allows the apparatus to have only one inlet. The flow of liquid through the inlet is split into two sub-flows within the apparatus, e.g. within the head part.

In an embodiment of the apparatus, the membrane filtration device is arranged to operate in cross-flow mode.

Back-washing is thus not required. Instead, the membrane filtration device has an inlet, an outlet for filtrate and an outlet for retentate, also termed concentrate in the case of reverse osmosis filtration devices. The rejected components of the liquid are removed with the retentate. The $CO_2$ passes through the membrane or membranes with the filtrate, whereas the ionic components are essentially retained.

A variant of this embodiment includes at least one device for adjusting a recovery ratio of the membrane filtration device, e.g. a variable flow resistance through which the apparatus is arranged to conduct liquid originating from a retentate outlet of the membrane filtration device.

This variant allows the total dissolved solids (TDS) concentration of the filtrate and thus of the conditioned liquid supplied by the liquid treatment apparatus to be adjusted. It may in particular be adjusted in dependence on the concentration of components contributing to carbonate hardness dissolved in the liquid treatment device downstream of the filtration device. If this is high, the TDS of the filtrate can be lowered so that the TDS of the conditioned liquid is still below a maximum specified for the conditioned liquid. The at least one device for adjusting the recovery ratio includes at least one device for adjusting a trans-membrane pressure differential. The at least one device for adjusting the recovery ratio may include a pump, e.g. located between the device for the treatment of liquid by ion exchange and the inlet of the membrane filtration device. The at least one device for adjusting the recovery ratio may include a variable flow resistance, e.g. arranged downstream of a retentate outlet of the membrane filtration device. The at least one device for adjusting the recovery ratio may include a variable pressure-reducing device arranged upstream of the inlet of the membrane filtration device, e.g. between the device for the treatment of liquid by ion exchange and the inlet of the membrane filtration device.

A variant of this embodiment includes a control device for providing a signal to at least one of the at least one devices for adjusting the recovery ratio in dependence on at least one of a target value and a target range of a measure representative of a concentration of components in liquid, e.g. a total mineral concentration.

The control device may be provided with the target value or target range through an interface, e.g. a communications interface for receiving a signal from an appliance or a human-machine interface for receiving input from a user. The control device may alternatively be provided with information from which the target value or target range can be inferred, e.g. information specifying the use to which the conditioned liquid is to be put.

In an embodiment, the apparatus includes at least one device for adjusting a trans-membrane pressure differential in the membrane filtration device.

This also provides a means of varying the total dissolved solids (TDS) concentration of the filtrate and thus of the conditioned liquid supplied by the liquid treatment apparatus to be adjusted. The adjustment device may be a pump or a variable flow resistance.

In a variant of this embodiment, the apparatus includes a control device for providing a signal to at least one of the at least one devices for adjusting a trans-membrane pressure differential in the membrane filtration device in dependence on at least one of a target value and a target range of a measure of a concentration of components in liquid, e.g. a total mineral concentration.

In an embodiment of the apparatus, the membrane filtration device is one of a nanofiltration and a reverse osmosis filtration device.

The membrane or membranes of this embodiment may have a pore size of at most 10 Å or be so dense as to be effectively non-porous. The membrane filtration device of this embodiment is effective to remove dissolved minerals from the liquid passing through it.

In an embodiment of the apparatus, the section for processing the filtrate includes a section accommodating the at least one mineral to be dissolved, the section for processing the filtrate defines a flow path bypassing the section accommodating the at least one mineral to be dissolved, and the section for processing the filtrate includes a mixing location for blending liquid led through the section accommodating the at least one mineral to be dissolved with liquid led along the flow path bypassing that section.

Regardless of the available amount of free $CO_2$, an aqueous liquid in a closed system and in equilibrium with a mineral contributing to carbonate hardness will have a pH in a relatively narrow band, provided the $CO_2$ level is within the right range. That is to say, the pH will vary relatively little with the $CO_2$ level within that range. Indeed, for a mineral such as magnesium carbonate, the pH will always be about 10. This corresponds to equilibrium between $HCO_3^-$ and $CO_3^{2-}$. For certain applications, a lower pH is required. An example is drinking water for brewing coffee. The liquid bypassing the section accommodating the at least one mineral to be dissolved will contain free $CO_2$ but be almost totally demineralised. Blending allows the carbonate hardness to be set to a target value or within a target range subject to restrictions on the pH. This is because the pH does not vary in the same way as the carbonate hardness with the level of $CO_2$. Thus, by varying the level of $CO_2$ introduced into the liquid and varying the blending fraction, a wider range of combinations of values of the carbonate hardness and the pH of the conditioned liquid is achievable. The TDS of the liquid may be adjusted by adjusting the trans-membrane pressure differential of the membrane filtration device. It is thus possible to adjust three parameters of an aqueous liquid independently.

In an embodiment, the liquid treatment device for dissolving at least one mineral contributing to carbonate hardness includes at least one replaceable liquid treatment cartridge including at least one chamber accommodating at least one of the minerals.

This makes it easier to handle the minerals at the point of use. Contamination may be avoided, for example.

An embodiment of the apparatus includes a sensor system for quantifying a reduction in carbonate hardness of an aqueous liquid between the least one inlet and the inlet of the membrane filtration device.

The reduction in carbonate hardness corresponds to an increase in free $CO_2$. Thus, the sensor system provides the information from which the increase in the concentration of minerals dissolved in the liquid treatment device included in the section for processing the filtrate produced by the membrane filtration device can be derived. The increase in free $CO_2$ can be estimated by determining the reduction in carbonate hardness. A relatively precise estimation will take into account the ratio of magnesium carbonate to calcium carbonate. It is also possible to determine the reduction of the calcium carbonate concentration using the same methods as are available for determining the carbonate hardness reduction but with one or more ion-selective sensors.

In a variant of this embodiment, the sensor system includes a sensor downstream of the liquid treatment device for the treatment of liquid by ion exchange, at least one device for varying a proportion of liquid treated by the cation exchange material of which at least a portion is in the hydrogen form in a blend of liquid further including liquid that has bypassed the cation exchange material of which at least a portion is in the hydrogen form and a signal processing device, arranged to infer the reduction from a variation in the signal in response to a variation in the proportion.

A method of determining the carbonate hardness of untreated aqueous liquid using only a sensor downstream of a liquid treatment device for the treatment of liquid by ion exchange and arranged to provide a signal representative of a measure of components removable by the liquid treatment device in the blend of liquid is described in WO 2014/006128 A1. The method of inferring the reduction from a variation in the signal in response to a variation in the proportion obviates the need for a sensor upstream of the liquid treatment device. It is thus not necessary to calibrate two sensors, nor is one of them exposed to completely untreated liquid. The sensor may be a conductance sensor, optionally ion-selective. It may provide a signal adjusted for deviations from a reference temperature and thus include a thermometer. This takes account of the temperature-dependence of activity coefficients of ions in the liquid.

An embodiment of the apparatus includes a sensor for obtaining a signal representative of a parameter at least dependent on a total concentration of minerals dissolved in liquid, e.g. located downstream of the membrane filtration device.

This may be a sensor as described above for use in determining the reduction in carbonate hardness, only positioned at least downstream of the membrane filtration device. If the concentration of free $CO_2$ in the filtrate is known, then the sensor may be placed upstream of the liquid treatment device for dissolving at least one mineral.

According to another aspect, the method of conditioning an aqueous liquid according to the invention is characterised in that at least one of the at least one steps of subjecting the liquid to the treatment by ion exchange is carried out prior to subjecting the liquid to membrane filtration, and in that the free $CO_2$ is passed through the membrane whereupon it is used to raise the concentration of dissolved minerals contributing to carbonate hardness.

An embodiment includes reducing the carbonate hardness of the liquid through the treatment by ion exchange to an extent dependent on at least one of a target value and a target range of the carbonate hardness in the conditioned liquid.

Reducing the carbonate hardness, more specifically the calcium carbonate concentration, corresponds to raising the level of free $CO_2$, so that it actually corresponds to a higher carbonate hardness in the conditioned liquid. The filtrate has a reduced mineral concentration in any case.

An embodiment includes blending the liquid subjected to the treatment by ion exchange with liquid that is at most subjected to a lower extent to the treatment by ion exchange.

This is a relatively effective way of adjusting the free $CO_2$ concentration in the liquid subjected to the membrane filtration. Because the free $CO_2$ passes the membrane or membranes, its concentration in the filtrate is also adjusted. Thereby, the concentration of dissolved minerals subsequent to treatment of the filtrate is determined.

A variant including reducing the carbonate hardness of the liquid through the treatment by ion exchange to an extent dependent on at least one of a target value and a target range of the carbonate hardness in the conditioned liquid and blending the liquid subjected to the treatment by ion exchange with liquid that is at most subjected to a lower extent to the treatment by ion exchange includes determining the extent of the reduction, which determination includes at least varying a blending ratio and measuring a resulting variation in a parameter of the blended liquid dependent on at least a concentration of components removable by subjecting the liquid to the treatment by ion exchange.

Thus, a method as described, for example, in WO 2014/006128 A1 is used to determine the carbonate hardness reduction and thus the increase in free $CO_2$. The method allows the carbonate hardness of the untreated liquid to be determined. With knowledge of the blending ratio and the efficacy of the carbonate hardness reduction by means of the treatment by ion exchange (which may be assumed to be 100%), the reduction in carbonate hardness can be quantified.

In an embodiment, liquid treated to increase the concentration of at least one mineral contributing to carbonate hardness in water is blended with filtrate not so treated, wherein a blending ratio is set in dependence on at least one of a target value and a target range of the pH of the conditioned aqueous liquid.

This embodiment takes account of the fact that, in a closed system at equilibrium which a carbonate mineral is dissolved, the pH will be relatively high and this value will be independent of the amount of free $CO_2$ added. Even if the mineral is a bicarbonate mineral, the pH may still be too high. To provide the conditioned liquid with a lower pH, it is blended with filtrate containing essentially only free $CO_2$.

In an embodiment of the method, the membrane filtration process is a cross-flow membrane filtration process.

Thus, there is no need for back-washing.

A variant of this embodiment includes adjusting a recovery ratio of the membrane filtration process in dependence on at least one of a target value and a target range of a measure of a concentration of minerals in the conditioned liquid.

Thus, the TDS of the conditioned liquid can be adjusted, e.g. in dependence also on the concentration of components contributing to carbonate hardness.

An embodiment of the method with a similar effect includes adjusting a trans-membrane pressure differential in the membrane filtration device in dependence on at least one of a target value and a target range of a measure of a concentration of minerals in the conditioned liquid.

An embodiment of the method includes the use of an apparatus according to the invention.

BRIEF DESCRIPTION OF THE DRAWINGS

The invention will be explained in further detail with reference to the accompanying drawings, in which.

DETAILED DESCRIPTION OF THE INVENTION

Figure 1:
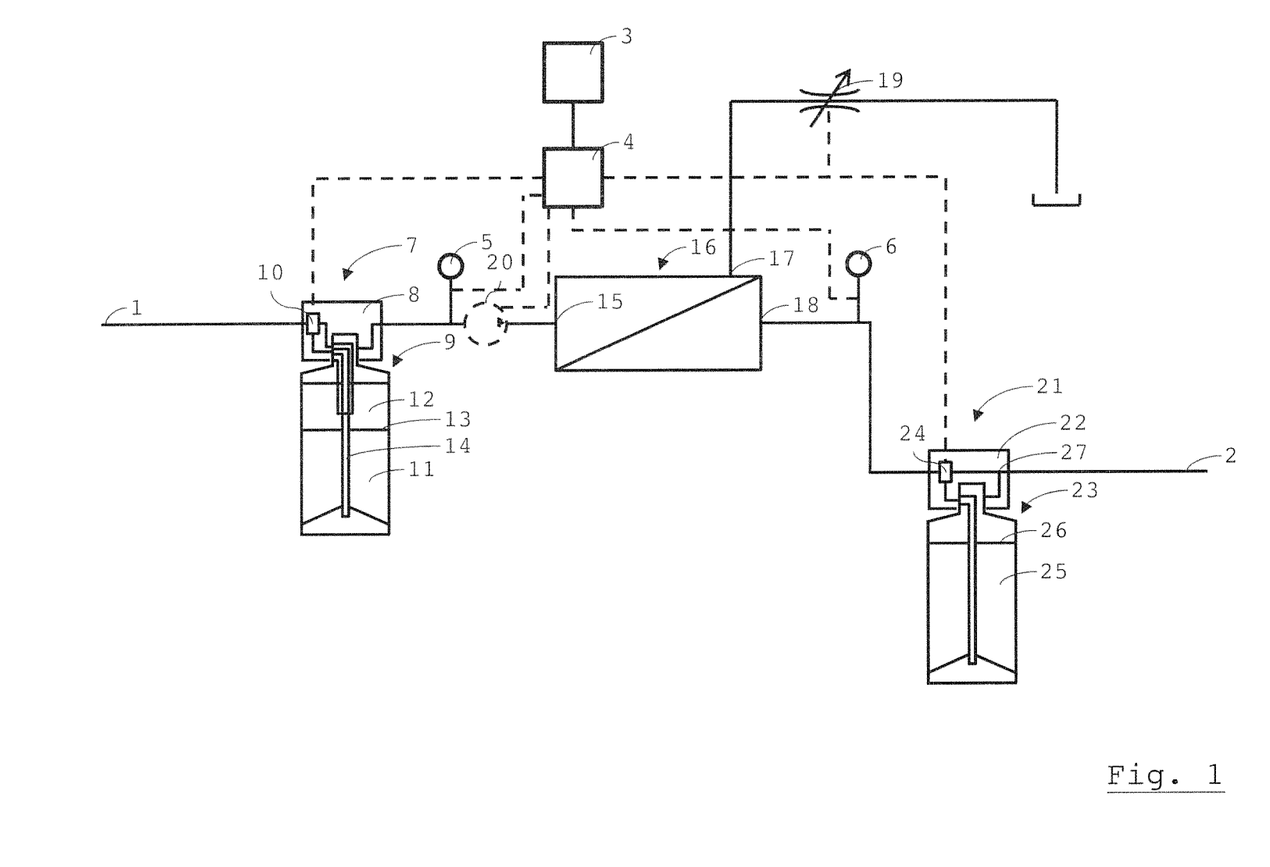
FIG. 1 is a schematic diagram of a liquid treatment apparatus.

A liquid treatment apparatus for the treatment of an aqueous liquid includes an inlet 1 and an outlet 2. The liquid may be mains drinking water, in which case the inlet 1 may include a coupler for connecting the apparatus to the mains drinking water supply. The outlet 2 may include at least one coupler for connecting the apparatus to one or more conduits for conducting liquid to one or more appliances (not shown). An example of such an appliance is a coffee machine, e.g. for a catering establishment.

The apparatus is configured to allow the aqueous liquid to meet several requirements simultaneously. This is the case even if the liquid received at the inlet is relatively saline, such as might be the case for drinking water in coastal regions. The requirements are the pH, the TDS (total dissolved solids) and the carbonate hardness (also referred to as alkalinity or temporary hardness).

In the illustrated embodiment, the apparatus includes an interface 3 for receiving information that is either directly representative of the target values or allows these target values to be inferred. An example of the latter would be a specification of the type of appliance to which the outlet 2 is connected to supply the treated liquid.

The information received through the interface 3 is passed to a control device 4 for controlling the operation of the liquid treatment apparatus.

The apparatus further includes a first conductivity sensor 5 and a second conductivity sensor 6, which are arranged to provide signals to the control device 4. At least the first of the first and second conductivity sensors 5,6 may be ion-selective, so that the signal corresponds to a measure of a concentration of a sub-set of ion species in the liquid, e.g. a measure of the concentration of only calcium carbonate. Generally, however, the method of operating the liquid treatment apparatus does not require such sensors, which are more expensive than conductivity sensors that are not ion-specific. The signal provided by at least one of the sensors 5,6 may be a signal adjusted for deviations from a reference temperature (e.g. 25 C), so it more closely approximates the ion concentration. In another embodiment, the control device makes the adjustment based on a signal from a separate thermometer (not shown). The adjustment may also be dispensed with, depending on the desired degree of accuracy.

The liquid treatment apparatus includes a first liquid treatment device 7 including a first head part 8 and a first replaceable liquid treatment cartridge 9. The first cartridge 9 has at least two inlet ports and at least one outlet port. The first cartridge 9 is connectable to the first head part 8 such that it is held to the first head part 8 and sealed liquid communication between the inlets of the first cartridge 9 and respective outlets of the first head part 8 and between the outlet or outlets of the first cartridge 9 and a corresponding number of respective inlets of the first head part 8 is established. This is interruptable by releasing the first cartridge 9 from the first head part 8. The connection and configuration of the first head part 8 and the first cartridge 9 may be as described in WO 2008/122496 A1, for example.

The first head part 8 is connected essentially permanently to the inlet 1 via a single conduit. The first head part 8 includes a first variable-ratio flow divider 10 for separating an incoming flow of liquid to be treated into two sub-flows, each provided to a separate respective inlet port of the first cartridge 9. Settings of the first variable-ratio flow divider 10 are adjustable by an actuator controlled by the control device 4. The actuator may be a stepper motor or a servo motor, for example. The control device 4 is configured to relate the volumetric flow rate ratio between the sub-flows to a value of the settings under its control.

The first cartridge 9 includes a first bed 11 of liquid treatment medium including cation exchange resin of which at least a portion is in the hydrogen form. It may be essentially completely in the hydrogen form on first use. Alternatively, some of the ion exchange resin may initially be loaded with an alkali metal ion, e.g. sodium or potassium. At least the majority of the cation exchange resin is initially in the hydrogen form. That is to say that the majority of functional sites per unit volume (volumetric capacity as determined e.g. in accordance with DIN 54403 or ASTM D4266) has a hydrogen ion as its counterion. The liquid treatment medium may include a mixture of different resins or only one cation exchange resin. The cation exchange resin or resins may be weakly acidic cation exchange resin, e.g. having carboxyl groups as their functional groups. The liquid treatment medium in the first bed 11 may include other materials than cation exchange resins.

In use, the hydrogen is desorbed in exchange for magnesium and calcium ions. The hydrogen reacts with bicarbonate ions to form $H_2O$ and $CO_2$. The $CO_2$ is not gassed out, because the liquid treatment apparatus forms an essentially closed system. Instead, it is present as free $CO_2$.

The first cartridge 9 further includes a second bed 12 of liquid treatment medium, separated from the first bed 11 by a liquid-permeable retainer device 13. The second bed 12 may contain a liquid treatment medium for the treatment of liquid by sorption, e.g. a liquid treatment medium for the treatment of liquid other than by ion exchange. The liquid treatment medium may in particular include activated carbon.

The first sub-flow created by the first variable-ratio flow divider 10 is conducted to an opposite end of the first cartridge 9 to the end by which it is connected to the first head part 8 by a fall tube 14. From there it passes through the first bed 11 to the second bed 12. The second sub-flow is conducted directly to the second bed 12, bypassing the first bed 11. The two sub-flows mix in the second bed 12, from where the liquid is returned to the first head part 8. The first conductivity sensor 5 is located immediately downstream of the first head part 8. It thus measures a property of the liquid mix comprised of liquid treated in the first bed 11 and liquid that has bypassed the first bed 11.

The control device 4 sets the reduction in the carbonate hardness of the totality of liquid treated in the first liquid treatment device 7. To this end, a method along the lines of that disclosed in WO 2014/006128 A1 is carried out, the essentials of which are repeated here.

The untreated liquid will have a specific electrical conductance $s_0$ that is the sum of the electrical conductance $s_{CH}$ due to the carbonate and bicarbonate ions of the components contributing to carbonate hardness and the conductance $s_1 = s_0 - s_{CH}$ due to other components. It will be assumed here that the first bed 11 is completely effective in removing the carbonate and bicarbonate ions of the components contributing to carbonate hardness. These are replaced by $CO_2$, so that the conductance of the liquid treated in the first bed 11 has the value $s_1$. It will be assumed that the liquid that bypasses the first bed 11 retains its original specific conductance $s_0$. The fraction of liquid that has bypassed the first bed 11 in the mix to which the first conductivity sensor 5 is exposed is referred to here as the blending fraction x. The first conductivity sensor 5 thus measures a specific electrical conductance $s(x)$, wherein $s(x) = x \cdot s_0 + (1-x) \cdot (s_0 - s_{CH}) = s_0 - (1-x) \cdot s_{CH}$. The specific electrical conductance $s_{CH}$ due to the carbonate hardness can be obtained by determining the derivative $s'(x)$. The value of the carbonate hardness can be obtained by multiplying this derivative by a conversion factor F. This conversion factor F may be a pre-determined constant or determined by means of a method as set out in WO 2014/006129 A1. The reduction $\Delta CH$ then follows as $\Delta CH = (1-x) \cdot F \cdot s'(x)$. The value of the derivative $s'(x)$ of the electrical conductance with respect to the blending fraction x is approximated by varying the blending fraction by a small amount $\Delta x$ and determining the resultant variation $\Delta s$ in the electrical conductance $s(x)$ measured by the first conductivity sensor 5. In this way, the control device 4 is able to determine the reduction in carbonate hardness and thus the amount of free $CO_2$ generated using the signal from only the first conductivity sensor 5. There is no need to provide a further conductivity sensor upstream of the first liquid treatment device 7 and to subtract the conductance determined by the first conductivity sensor 5 from that measured by such a further sensor. Thus, calibration problems due to different rates of sensor drift and problems with scale formation on an upstream sensor are avoided.

In a variant of this method, an ion-selective conductivity sensor (not shown) is used in addition to the first conductivity sensor 5. This additional sensor enables the concentration of only calcium ions or only magnesium ions to be determined, for example. This is useful, because the level of free $CO_2$ depends on whether the concentration of $CaCO_3$ or $MgCO_3$ is reduced. Thus, with knowledge of the ratio of the concentration of calcium ions to magnesium ions in the untreated water enables the level of free $CO_2$ to be determined more accurately from the reduction $\Delta CH$ in carbonate hardness.

Although the illustrated embodiment assumes that the control device 4 is able to relate settings of the first variable-ratio flow divider 10 to a value of the blending fraction x, an alternative embodiment may include flow meters to determine the volumetric flow rate ratio between the two sub-flows created by the first variable-ratio flow divider 10.

The liquid treated by the first liquid treatment device 7 is conducted to an inlet 15 of a membrane filtration device 16 arranged to operate as a cross-flow filtration device. It thus has an outlet 17 for retentate and an outlet 18 for filtrate. The membrane filtration device 16 may include one or more membrane modules, e.g. in the form of a spiral wound membrane module, a hollow fibre membrane module, a tubular membrane module and/or a membrane in sheet form mounted on a frame. The membrane or membranes may have a pore size of at most 10 Å, indeed be nonporous, so that the membrane filtration device 16 is effective to remove at least some ions. However, the membrane or membranes is or are permeable to the free $CO_2$. The membrane or membranes may be composite membranes, e.g. with a porous sublayer and a thin dense, for example nonporous top layer. In a reverse osmosis membrane, water and small molecules such as $CO_2$ diffuse through vacancies in the molecular structure of the membrane material, whereas ions in solution and larger molecules do not. An example of a suitable membrane is a composite membrane comprising a support layer with a thickness of ~120 µm made of polyester, an ultrafiltration membrane with a thickness of ~40 µm made of polysulfone or polyethersulfone and an active layer with a thickness of ~200 nm made of polyamide or cellulose acetate.

The filtrate exiting through the filtrate outlet 18 thus has a relatively low TDS value, but contains free $CO_2$. The recovery ratio, the ratio of filtrate to liquid supplied to the inlet 15 can be varied by adjusting a variable flow resistance 19. The settings of the variable flow resistance 19 are adjustable under the control of the control device 4, which uses the signal from the second conductivity sensor 6 for this purpose.

In an embodiment, it is also or alternatively possible to vary the trans-membrane pressure differential by means of a pump 20 or a further or alternative variable flow resistance (not shown), located upstream of the inlet 15.

The filtrate passes to a second liquid treatment device 21, which includes a second head part 22 and a second replaceable liquid treatment cartridge 23. The second cartridge 23 has at least one inlet port and at least one outlet port. The second cartridge 23 is connectable to the second head part 22 such that it is held to the second head part 22 and sealed liquid communication between the inlet port or ports of the second cartridge 23 and respective outlet ports of the second head part 22 and between the outlet port or outlet ports of the second cartridge 23 and a corresponding number of respective inlet ports of the second head part 22 is established. This is interruptable by releasing the second cartridge 23 from the second head part 22. The connection and configuration of the second head part 22 and the second cartridge 23 may be as described in WO 2008/122496 A1, for example.

The second head part 22 includes a second variable-ratio flow divider 24 for separating a flow of liquid into at least two sub-flows. At least one of the sub-flows is led into the second replaceable liquid treatment cartridge 23 through an outlet port of the second head part 22 and an inlet port of the second replaceable liquid treatment cartridge 23. It is conducted to an opposite end of the second replaceable liquid treatment cartridge 23 to the end connected to the second head part 22. From there, it passes through a bed 25 of minerals, which dissolve into the liquid. The liquid passes through a liquid-permeable retainer device 26 to an outlet port of the second replaceable liquid treatment cartridge 23 in liquid communication with an inlet port of the second head part 22, and from there to a mixing location 27 in the second head part 22. The liquid forming the sub-flow or sub-flows passed through the bed of minerals 25 is mixed with the other sub-flow or sub-flows created by the second variable-ratio flow divider 24 at the mixing location. The other sub-flow or sub-flows bypass the second replaceable liquid treatment cartridge 23 and are thus composed essentially of filtrate carrying free $CO_2$.

In an alternative embodiment, the bypass is not through the second head part 22 but through a section of the second replaceable liquid treatment cartridge 23 separate from the bed 25 of minerals, so that at least one sub-flow still bypasses the bed 25 of minerals. In such an embodiment, the mixing location may be in the cartridge 23, so that the second head part 22 need not include a bypass conduit. This embodiment would allow for the use of a second head part 22 of identical construction to the first head part 8.

The minerals in the bed 25 may include any mineral or mixture of minerals for increasing the carbonate hardness. They may include at least one of magnesium carbonate and calcium carbonate, e.g. in granular form. They may include any one or more of magnesium oxide, calcium oxide, magnesium calcium carbonate ($MgCa(CO_3)_2$, magnesium hydroxide and calcium hydroxide. They may be present in granular form. In an alternative embodiment, the second replaceable liquid treatment cartridge 23 may be arranged to mix a concentrated mineral solution or paste with the filtrate passing through it.

The free $CO_2$ increases the solubility of the minerals in the bed 25, such that the $CO_2$ concentration determines the carbonate hardness of the liquid leaving the second replaceable liquid treatment cartridge 23.

Figure 2:
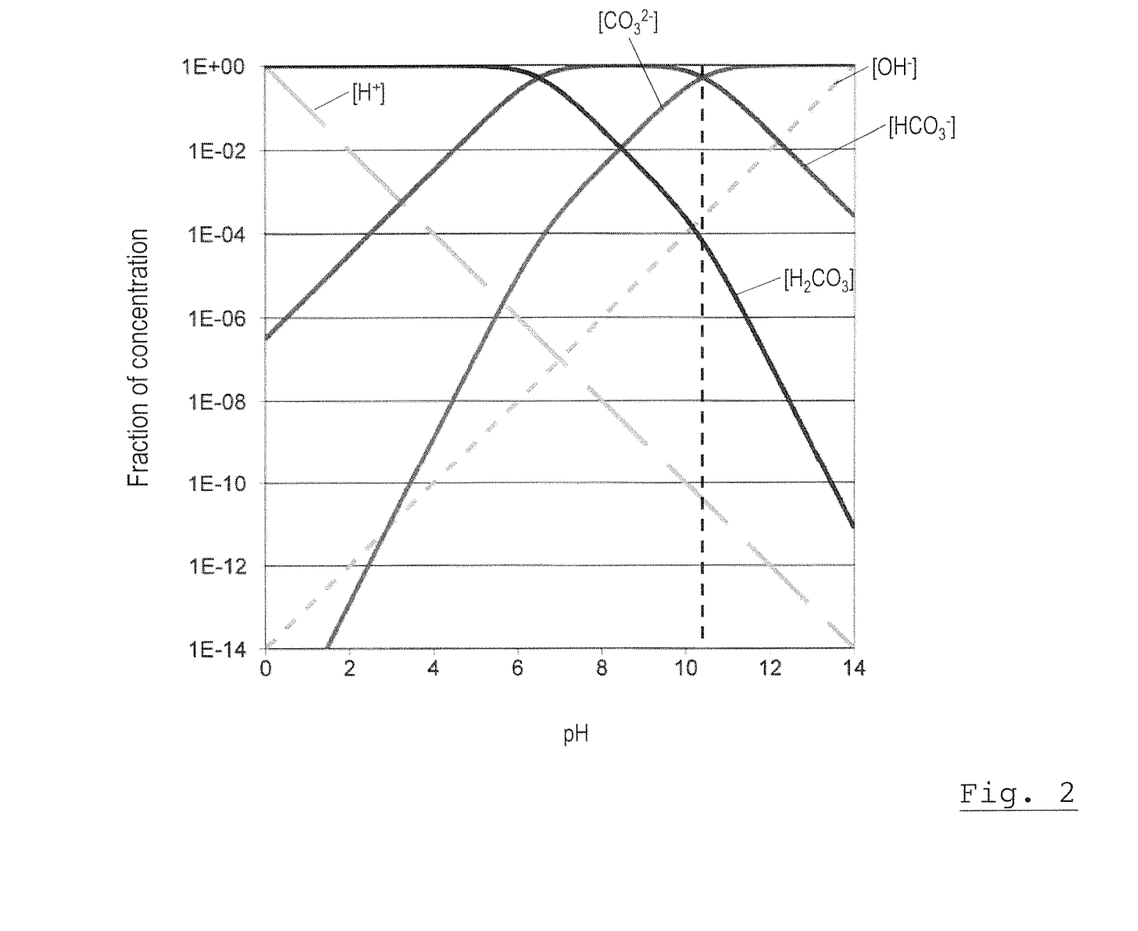
FIG. 2 is a diagram showing the distribution of carbonate species as a fraction of total dissolved carbonate in relation to solution pH.

If the mineral in the bed 25 consists essentially of magnesium carbonate, then the pH of the liquid leaving the second replaceable liquid treatment cartridge 23 is always approximately the same, as shown in FIG. 2, provided the level of free $CO_2$ is in the order of $mg \cdot l^{-1}$. The diagram is valid for a closed system in which no $CO_2$ is added or removed. The pH will then be at the value indicated by the dashed line, i.e. a little over 10, due to the presence of large quantities of undissolved carbonate minerals. This embodiment is simple to operate.

For other minerals or mineral mixtures, the carbonate hardness of the liquid passing through the bed 25 will vary with the level of free $CO_2$. It will be relatively stable within a range of values of the level of free $CO_2$, which is the range in which control of the carbonate hardness and pH of the conditioned liquid provided at the outlet 2 is simplest. The pH will generally not show the same dependency on the level of free $CO_2$.

From the mixing location 27, the conditioned aqueous liquid flows to the outlet 2 of the liquid treatment apparatus. In an alternative embodiment, it may be conducted to a tank from which it can be dispensed on demand.

The control device 4 is arranged to control the first and second variable-ratio flow dividers 10,24 and the variable flow resistance 19 such that the conditioned liquid meets several requirements. As an example, the apparatus may be used to treat relatively saline drinking water to produce drinking water conditioned for brewing coffee. It is recommended, e.g. by trade bodies such as Deutscher Kaffeeverband, that such water have the following properties:

total mineral contents (TDS): 100-200 $mg \cdot l^{-1}$;
carbonate hardness: 3-6°dH; and
pH: 6.5-7.5.

In a practical embodiment of the apparatus, the control device 4 will consult data stored in memory that relate the carbonate hardness of the liquid at the inlet 1 and a target value of the carbonate hardness at the outlet 2 with settings of at least the first and second variable-ratio flow dividers 10,24. The carbonate hardness of the liquid at the inlet 1 is required in order to be able to set a particular level of free $CO_2$. The stored settings ensure that the constraints on the value of the pH of the conditioned liquid to be supplied at the outlet 2 are also met.

Such stored data may be obtained in an iterative process as follows. First, the approximate concentration of free $CO_2$ necessary to arrive at the upper end of the recommended carbonate hardness range is determined. The appropriate settings of the second variable-ratio flow divider 24 for arriving at a pH below the upper end of the recommended range are then determined. If these would result in a value of the carbonate hardness that is too low, a new value of the free $CO_2$ is determined in a further iteration. Once values for meeting both requirements have been determined, the variable-ratio flow dividers 10,24 are adjusted to appropriate settings, whereupon at least one of the variable-flow resistance 19 and the pump 20 is adjusted to meet the TDS requirements. This adjustment does not appreciable affect the carbonate hardness, since it has in any case already been reduced by the first liquid treatment device 7 and the membranes in the membrane filtration device 16 will predominantly allow the monovalent ions through, as opposed to the divalent ones.

It is thus possible to ensure that several requirements are met, even if the liquid received at the inlet 1 has a relatively high sodium chloride concentration.

Instead of controlling the variable flow resistance 19 or the pump 20 in dependence on at least one of a target value and a target range for the TDS, an alternative embodiment (FIG. 3) includes a recirculation line 28 for conducting a variable portion of the liquid from the retentate outlet 17' back to the inlet 15' of the membrane filtration device 16. The recirculation line 28 includes a one-way valve 29 for ensuring that liquid can only flow from the retentate outlet 17' to the inlet 15', and may include a pump (not shown). The control device 4' determines the mixing ratio of liquid from the retentate outlet 17' to liquid from the first liquid treatment device 7' in dependence on at least one of a target value and a target range of a measure representative of a concentration of components in liquid, e.g. the TDS. The mixing ratio is set by controlling a variable flow resistance 30.

Figure 3:
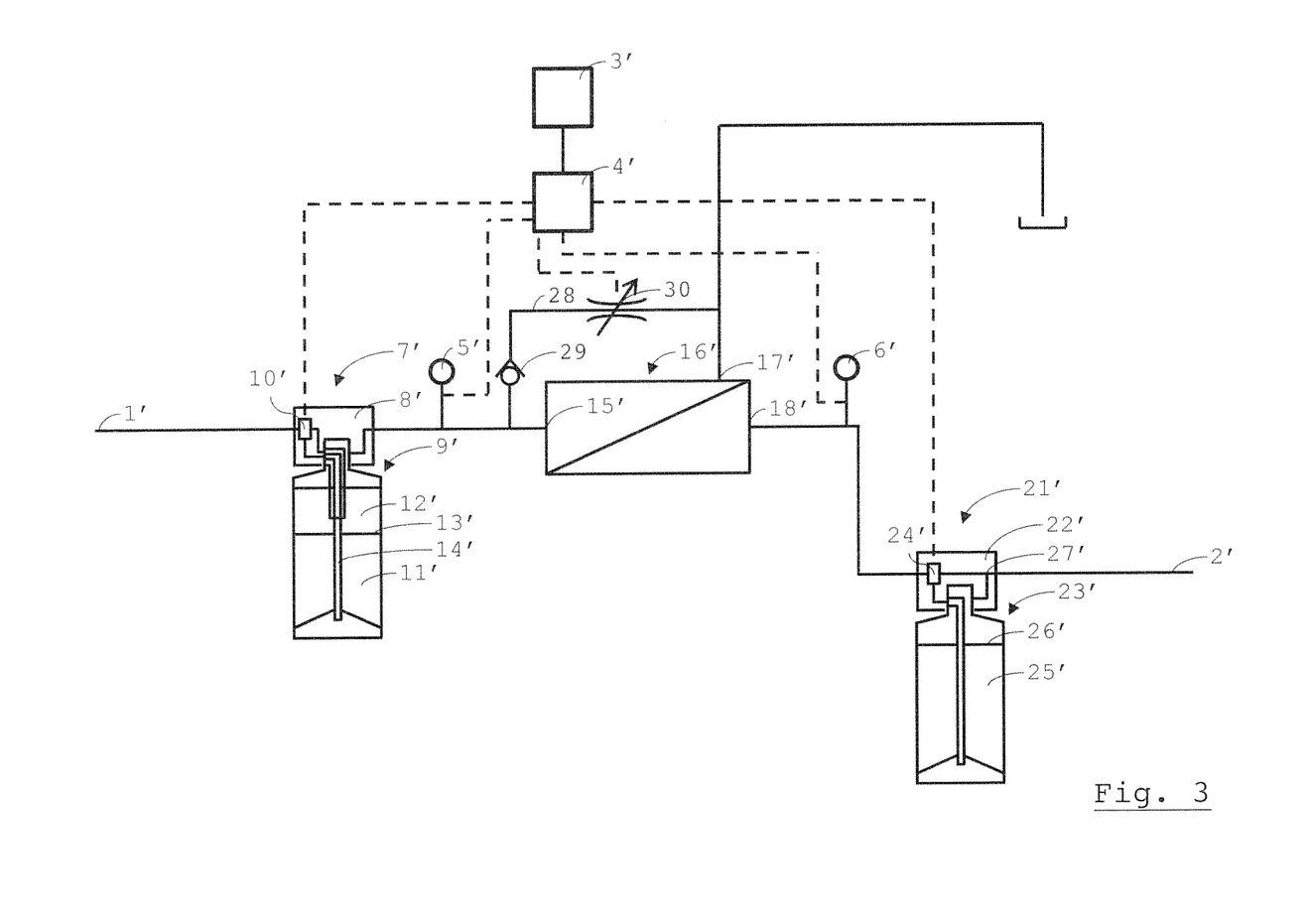
FIG. 3 is a schematic diagram of an alternative liquid treatment apparatus.

In other respects, the apparatus of FIG. 3 is like that of FIG. 1, so that like parts have been given like reference numerals.

The invention is not limited to the embodiments described above, which may be varied within the scope of the accompanying claims. The first liquid treatment device 7 need not be the only liquid treatment device between the inlet 1 and the inlet 15 of the membrane filtration device 16. For example, there may be a sediment filter upstream of the first liquid treatment device 7 or a separate activate carbon filter between the first liquid treatment device 7 and the membrane filtration device 16.

The first and second variable-ratio flow dividers 10,24 need not be coupled to a control device 4 for adjusting their settings. In an alternative embodiment, at least one the first and second variable-ratio flow dividers 10,24, e.g. both, is adjustable by hand or by means of a hand tool. A user may be provided with a device for measuring the carbonate hardness of water received at the inlet 1 and a table for relating this value and a chosen target value of the carbonate hardness in the water at the outlet 2 to settings of the variable-ratio flow dividers 10,24.

Instead of first determining the approximate concentration of free $CO_2$ necessary to arrive at the upper end of a recommended carbonate hardness range and then determining settings of the second variable-ratio flow divider 24 for arriving at a pH below the upper end of the recommended range, it is also possible to start with a determination of the settings of the second variable-ratio flow divider 24 and to adjust the settings of the first variable-ratio flow divider 10 in a subsequent step.

LIST OF REFERENCE NUMERALS

1,1' inlet
2,2' outlet
3,3' interface
4,4' control device
5,5' $1^{st}$ conductivity sensor
6,6' $2^{nd}$ conductivity sensor
7,7' $1^{st}$ liquid treatment device
8,8' $1^{st}$ head part
9,9' $1^{st}$ replaceable liquid treatment cartridge
10,10' $1^{st}$ variable-ratio flow divider
11,11' $1^{st}$ bed of liquid treatment medium
12,12' $2^{nd}$ bed of liquid treatment medium
13,13' liquid-permeable retainer device
14,14' fall tube
15,15' inlet
16,16' membrane filtration device
17,17' outlet for retentate
18,18' outlet for filtrate
19 variable flow resistance
20 (optional) pump
21,21' $2^{nd}$ liquid treatment device
22,22' $2^{nd}$ head part
23,23' $2^{nd}$ replaceable liquid treatment cartridge
24,24' $2^{nd}$ variable-ratio flow divider
25,25' mineral bed
26,26' $2^{nd}$ liquid-permeable retainer device
27,27' mixing location
28 recirculation line
29 one-way valve
30 variable flow resistance

What is claimed is:

1. An apparatus for conditioning an aqueous liquid, including:
   a membrane filtration device for filtering salts from the liquid;
   an inlet which is connected to an inlet of the membrane filtration device via at least a first liquid treatment device for the treatment of liquid by ion exchange including a cation exchange material of which a majority of functional sites per unit volume have a hydrogen ion as their counterion and effective to a) release hydrogen in exchange for cations of carbonate minerals in the liquid to be treated and b) increase the amount of free carbon dioxide in the liquid, wherein the first liquid treatment device is arranged upstream from the membrane filtration device; and
   wherein the inlet of the apparatus includes a coupler for connecting the apparatus to a mains water supply; and
   a section arranged to process filtrate produced by the membrane filtration device,
   which section includes a second liquid treatment device for dissolving at least one mineral contributing to carbonate hardness in water into at least some of the liquid passing through the section, wherein the second liquid treatment device includes minerals that are one or more of magnesium oxide, calcium oxide, magnesium calcium carbonate $MgCa(CO_3)_2$, magnesium carbonate, calcium carbonate, magnesium hydroxide and calcium hydroxide,
   wherein the apparatus forms a closed system so that degassing of carbon dioxide is prevented, and
   wherein the at least one membrane in the membrane filtration device is permeable to the increased amount of free carbon dioxide.

2. The apparatus according to claim 1, wherein the first liquid treatment device for the treatment of liquid by ion exchange includes at least one replaceable liquid treatment cartridge housing the cation exchange material.

3. The apparatus according to claim 2, wherein the inlet of the apparatus is connected to the inlet of the membrane filtration device via a flow path bypassing at least a section of the first one liquid treatment device containing the cation exchange material.

4. The apparatus according to claim 3, including at least one device, for adjusting a volumetric flow rate ratio between liquid flowing through the section of the first liquid treatment device containing the cation exchange material and liquid flowing along the flow path bypassing the section.

5. The apparatus according to claim 3, wherein the liquid treatment cartridge includes a mixing location where the flow path bypassing the section containing the cation exchange material joins a flow path extending through the section containing the cation exchange material.

6. The apparatus according to claim 1, including at least one device for adjusting a recovery ratio of the membrane filtration device, through which the apparatus is arranged to conduct liquid originating from a retentate outlet of the membrane filtration device.

7. The apparatus according to claim 1, including a sensor system for quantifying a reduction in carbonate hardness of an aqueous liquid between the inlet of the apparatus and the inlet of the membrane filtration device.

8. The apparatus according to claim 7, wherein the sensor system includes a sensor downstream of the first liquid treatment device for the treatment of liquid by ion exchange, at least one device for varying a proportion of liquid treated by the cation exchange material in a blend of liquid further including liquid that has bypassed the cation exchange material and a signal processing device, arranged to infer the reduction from a variation in the signal in response to a variation in the proportion.

9. A method of conditioning an aqueous liquid containing carbonate ions obtained from a mains water supply, including:
   i) at least one step of subjecting the liquid to a treatment by ion exchange, wherein the liquid is contacted with a cation exchange material of which a majority of functional sites per unit volume have a hydrogen ion as their counterion and effective to a) release hydrogen in exchange for cations of carbonate materials in the liquid to be treated and b) increase the amount of free carbon dioxide in the liquid;
   ii) subjecting the liquid to membrane filtration to obtain filtrate, wherein salts are removed from the liquid; and
   iii) treating the filtrate,
   wherein treating the filtrate includes increasing a concentration of at least one mineral contributing to carbonate hardness in water with the use of minerals that are one or more of magnesium oxide, calcium oxide, magnesium calcium carbonate $MgCa(CO_3)_2$, magnesium carbonate, calcium carbonate, magnesium hydroxide and calcium hydroxide,
   wherein at least one of the at least one steps of subjecting the liquid to the treatment by ion exchange is carried out prior to subjecting the liquid to membrane filtration, and wherein the increased amount of free carbon dioxide is passed through the membrane whereupon it is used to raise the concentration of dissolved minerals contributing to carbonate hardness, and
   wherein steps i), ii) and iii) are performed in order.

10. The method according to claim 9, including reducing the carbonate hardness of the liquid through the treatment by ion exchange to an extent dependent on at least one of a target value and a target range of the carbonate hardness in the conditioned liquid.

11. The method according to claim 9, including blending the liquid subjected to the treatment by ion exchange with liquid that is at most subjected to a lower extent to the treatment by ion exchange.

12. The method according to claim 9, including the use of an apparatus comprising:
   a membrane filtration device for filtering salts from the liquid;
   an inlet which is connected to an inlet of the membrane filtration device via at least a first liquid treatment device for the treatment of liquid by ion exchange including a cation exchange material of which a majority of functional sites per unit volume have a hydrogen ion as their counterion and effective to a) release hydrogen in exchange for cations of carbonate minerals in the liquid to be treated and b) increase the amount of free carbon dioxide in the liquid,
   wherein the inlet of the apparatus includes a coupler for connecting the apparatus to a mains water supply; and
   a section arranged to process filtrate produced by the membrane filtration device, which section includes a second liquid treatment device for dissolving at least one mineral contributing to carbonate hardness in water into at least some of the liquid passing through the section, wherein the second liquid treatment device includes minerals that are one r more of magnesium oxide, calcium oxide, magnesium calcium carbonate $MgCa(CO_3)_2$, magnesium carbonate, calcium carbonate, magnesium hydroxide and calcium hydroxide,
   wherein the apparatus forms a closed system so that degassing of carbon dioxide is prevented, and
   wherein the at least one membrane in the membrane filtration device is permeable to carbon dioxide.

13. The apparatus according to claim 4, wherein the liquid treatment cartridge includes a mixing location where the flow path bypassing the section containing the cation exchange material joins a flow path extending through the section containing the cation exchange material, and wherein the membrane filtration device is arranged to operate in cross-flow mode.

14. The apparatus according to claim 13, including at least one device for adjusting a recovery ratio of the membrane filtration device, through which the apparatus is arranged to conduct liquid originating from a retentate outlet of the membrane filtration device, wherein the section for processing the filtrate includes a section accommodating the at least one mineral to be dissolved, wherein the section for processing the filtrate defines a flow path bypassing the section accommodating the at least one mineral to be dissolved, and wherein the section for processing the filtrate includes a mixing location for blending liquid led through the section accommodating the at least one mineral to be dissolved with liquid led along the flow path bypassing that section.

15. The apparatus according to claim 14, including a sensor system for quantifying a reduction in carbonate hardness of an aqueous liquid between the inlet of the apparatus and the inlet of the membrane filtration device, and wherein the sensor system includes a sensor downstream of the first liquid treatment device for the treatment of liquid by ion exchange, at least one device for varying a proportion of liquid treated by the cation exchange material in the hydrogen form in a blend of liquid further including liquid that has bypassed the cation exchange material and a signal processing device, arranged to infer the reduction from a variation in the signal in response to a variation in the proportion.

16. The method according to claim 10, including blending the liquid subjected to the treatment by ion exchange with liquid that is at most subjected to a lower extent to the treatment by ion exchange.

17. The apparatus according to claim 1,
   wherein the apparatus is configured to set a free carbon dioxide concentration by adding free carbon dioxide only by using the first liquid treatment device.

18. The method according to claim 9, wherein a free carbon dioxide concentration is set by adding free carbon dioxide only by using the first liquid treatment device.

19. The apparatus according to claim 1, wherein at least one of the at least one inlets of the apparatus is connected to the inlet of the membrane filtration device via a flow path bypassing at least a section of the liquid treatment device containing the cation exchange material of which a majority of functional sites per unit volume have a hydrogen ion as their counterion, and
   wherein the apparatus is provided with a mixing location where the liquid passing through the section containing the cation exchange material of which a majority of functional sites per unit volume have a hydrogen ion as their counterion is blended with liquid that has bypassed the section.

20. The apparatus according to claim 19, wherein the apparatus includes:
   at least one device for adjusting a volumetric flow rate ratio between liquid flowing through the section of the liquid treatment device containing the cation exchange material of which a majority of functional sites per unit volume have a hydrogen ion as their counterion and liquid flowing along the flow path bypassing the section; and a control device for providing a signal to the device for adjusting the volumetric flow rate ratio in dependence on at least one of a target value and a target range of a measure of a concentration of components contributing to carbonate hardness in liquid at an outlet of the apparatus downstream of the section including the second liquid treatment device.

* * * * *

UNITED STATES PATENT AND TRADEMARK OFFICE
CERTIFICATE OF CORRECTION

PATENT NO. : 12,024,453 B2
APPLICATION NO. : 15/755731
DATED : July 2, 2024
INVENTOR(S) : Simon Floren et al.

It is certified that error appears in the above-identified patent and that said Letters Patent is hereby corrected as shown below:

In the Claims

In Claim 12, Column 17, Line 64, replace "r" with --or--.

Signed and Sealed this
Fifteenth Day of October, 2024

Katherine Kelly Vidal
*Director of the United States Patent and Trademark Office*